（12）United States Patent
Shen

(10) Patent No.: US 9,113,517 B1
(45) Date of Patent: Aug. 18, 2015

(54) DIMMABLE AND BLINK-SUPPRESSIBLE LIGHT EMITTING DIODE DRIVING APPARATUS

(71) Applicant: Rosen Lite Inc., New Taipei (TW)

(72) Inventor: Wei-Hong Shen, New Taipei (TW)

(73) Assignee: Rosen Lite Inc., New Taipei (TW)

( * ) Notice: Subject to any disclaimer, the term of this patent is extended or adjusted under 35 U.S.C. 154(b) by 0 days.

(21) Appl. No.: 14/242,136

(22) Filed: Apr. 1, 2014

(51) Int. Cl.
*H05B 37/02* (2006.01)
*H05B 33/08* (2006.01)

(52) U.S. Cl.
CPC .................................. *H05B 33/0809* (2013.01)

(58) Field of Classification Search
USPC .......................... 315/291, 307, 308, 224, 122
See application file for complete search history.

(56) References Cited

U.S. PATENT DOCUMENTS

| | | | | |
|---|---|---|---|---|
| 8,324,840 | B2* | 12/2012 | Shteynberg et al. | 315/308 |
| 8,952,620 | B2* | 2/2015 | Jeong et al. | 315/186 |
| 9,013,114 | B2* | 4/2015 | Archenhold | 315/291 |
| 9,018,856 | B2* | 4/2015 | Jeong | 315/294 |
| 9,030,122 | B2* | 5/2015 | Yan et al. | 315/291 |
| 2011/0133655 | A1* | 6/2011 | Recker et al. | 315/159 |
| 2011/0181199 | A1* | 7/2011 | Lin et al. | 315/291 |
| 2012/0299500 | A1* | 11/2012 | Sadwick et al. | 315/224 |
| 2013/0069547 | A1* | 3/2013 | van de Ven et al. | 315/188 |
| 2013/0193879 | A1* | 8/2013 | Sadwick et al. | 315/307 |
| 2013/0278145 | A1* | 10/2013 | Lin et al. | 315/122 |
| 2013/0293139 | A1* | 11/2013 | Sadwick et al. | 315/224 |
| 2014/0091720 | A1* | 4/2014 | Brinlee | 315/186 |
| 2014/0265900 | A1* | 9/2014 | Sadwick et al. | 315/200 R |
| 2014/0320004 | A1* | 10/2014 | Roberts | 315/34 |
| 2015/0022105 | A1* | 1/2015 | Walker | 315/200 R |

* cited by examiner

*Primary Examiner* — Jimmy Vu
*Assistant Examiner* — Syed M Kaiser
(74) *Attorney, Agent, or Firm* — Muncy, Geissler, Olds & Lowe, P.C.

(57) ABSTRACT

An alternating current power supply apparatus sends an alternating current power to a dimmer. The dimmer dims the alternating current power to fetch a dimmed power. The dimmer sends the dimmed power to a rectification unit. The rectification unit rectifies the dimmed power to fetch a rectified power. The rectification unit sends the rectified power to an integration sampling unit and a light emitting diode. The integration sampling unit integrates, samples and converts the rectified power to fetch an integration voltage signal. The integration sampling unit sends the integration voltage signal to a voltage-to-current control conversion unit. The voltage-to-current control conversion unit converts the integration voltage signal to fetch a driving current signal to drive the light emitting diode. The driving current signal is constant, so that the light emitting diode is not blinking.

4 Claims, 4 Drawing Sheets

DIMMABLE AND BLINK-SUPPRESSIBLE LIGHT EMITTING DIODE DRIVING APPARATUS

BACKGROUND OF THE INVENTION

1. Field of the Invention

The present invention relates to a light emitting diode driving apparatus, and especially relates to a dimmable and blink-suppressible light emitting diode driving apparatus without electrolytic capacitors.

2. Description of the Related Art

Light emitting diodes have many advantages over incandescent light sources including lower energy consumption, longer lifetime, improved physical robustness, smaller size, and faster switching. Therefore, light emitting diodes are used widely for replacing fluorescent lamps or tungsten lamp. A light emitting diode driver is used to drive the light emitting diode.

However, the light emitting diode is blinking when the light emitting diode is applied to a conventional dimmer. Moreover, the light emitting diode driver needs electrolytic capacitors for filtering. The cost of the electrolytic capacitor is expensive and the life of the electrolytic capacitor is short.

SUMMARY OF THE INVENTION

In order to solve the above-mentioned problems, an object of the present invention is to provide a dimmable and blink-suppressible light emitting diode driving apparatus without electrolytic capacitors.

In order to achieve the object of the present invention mentioned above, the light emitting diode driving apparatus is applied to an alternating current power supply apparatus, a dimmer and at least a light emitting diode. The light emitting diode driving apparatus includes a rectification unit, an integration sampling unit and a voltage-to-current control conversion unit. The rectification unit is electrically connected to the dimmer and the light emitting diode. The integration sampling unit is electrically connected to the rectification unit and the light emitting diode. The voltage-to-current control conversion unit is electrically connected to the integration sampling unit and the light emitting diode. The alternating current power supply apparatus sends an alternating current power to the dimmer. The dimmer dims the alternating current power to fetch a dimmed power. The dimmer sends the dimmed power to the rectification unit. The rectification unit rectifies the dimmed power to fetch a rectified power. The rectification unit sends the rectified power to the integration sampling unit and the light emitting diode. The integration sampling unit integrates, samples and converts the rectified power to fetch an integration voltage signal. The integration sampling unit sends the integration voltage signal to the voltage-to-current control conversion unit. The voltage-to-current control conversion unit converts the integration voltage signal to fetch a driving current signal to drive the light emitting diode.

Moreover, the voltage-to-current control conversion unit includes a first contact, a first operational amplifier and a first resistor. The first operational amplifier is electrically connected to the first contact and the integration sampling unit. The first resistor is electrically connected to the first operational amplifier and the integration sampling unit.

Moreover, the voltage-to-current control conversion unit further includes a Zener diode, a first capacitor and a second capacitor. The Zener diode is electrically connected to the first contact. The first capacitor is electrically connected to the first contact. The second capacitor is electrically connected to the first operational amplifier.

Moreover, the voltage-to-current control conversion unit further includes a second resistor, a third capacitor and a third resistor. The second resistor is electrically connected to the first operational amplifier and the second capacitor. The third capacitor is electrically connected to the second resistor. The third resistor is electrically connected to the first operational amplifier and the second capacitor.

Moreover, the voltage-to-current control conversion unit further includes a first transistor and a fourth resistor. The first transistor is electrically connected to the second resistor, the third capacitor, the third resistor and the light emitting diode. The fourth resistor is electrically connected to the third resistor and the first transistor.

Moreover, the integration sampling unit includes a second contact, a fifth resistor and a sixth resistor. The second contact is electrically connected to the rectification unit and the light emitting diode. The fifth resistor is electrically connected to the second contact. The sixth resistor is electrically connected to the fifth resistor and the voltage-to-current control conversion unit.

Moreover, the integration sampling unit further includes a seventh resistor, a fourth capacitor and a fifth capacitor. The seventh resistor is electrically connected to the sixth resistor and the voltage-to-current control conversion unit. The fourth capacitor is electrically connected to the fifth resistor and the sixth resistor. The fifth capacitor is electrically connected to the sixth resistor, the voltage-to-current control conversion unit and the seventh resistor.

Moreover, the light emitting diode driving apparatus further includes an eighth resistor, a ninth resistor and a second operational amplifier. The eighth resistor is electrically connected to the first contact. The ninth resistor is electrically connected to the eighth resistor. The second operational amplifier is electrically connected to the eighth resistor, the ninth resistor, the third resistor, the fourth resistor and the first transistor.

Moreover, the light emitting diode driving apparatus further includes a sixth capacitor, a tenth resistor and an eleventh resistor. The sixth capacitor is electrically connected to the third resistor, the fourth resistor, the first transistor and the second operational amplifier. The tenth resistor is electrically connected to the second operational amplifier. The eleventh resistor is electrically connected to the tenth resistor.

Moreover, the light emitting diode driving apparatus further includes a second transistor, a twelfth resistor, a diode and a thirteenth resistor. The second transistor is electrically connected to the tenth resistor and the eleventh resistor. The twelfth resistor is electrically connected to the second transistor and the second contact. The diode is electrically connected to the second contact. The thirteenth resistor is electrically connected to the diode and the first contact.

The efficiency of the present invention is that the light emitting diode is not blinking when the light emitting diode is applied to a conventional dimmer. Moreover, the light emitting diode driver does not need electrolytic capacitors for filtering.

DETAILED DESCRIPTION OF THE INVENTION

Figure 1:
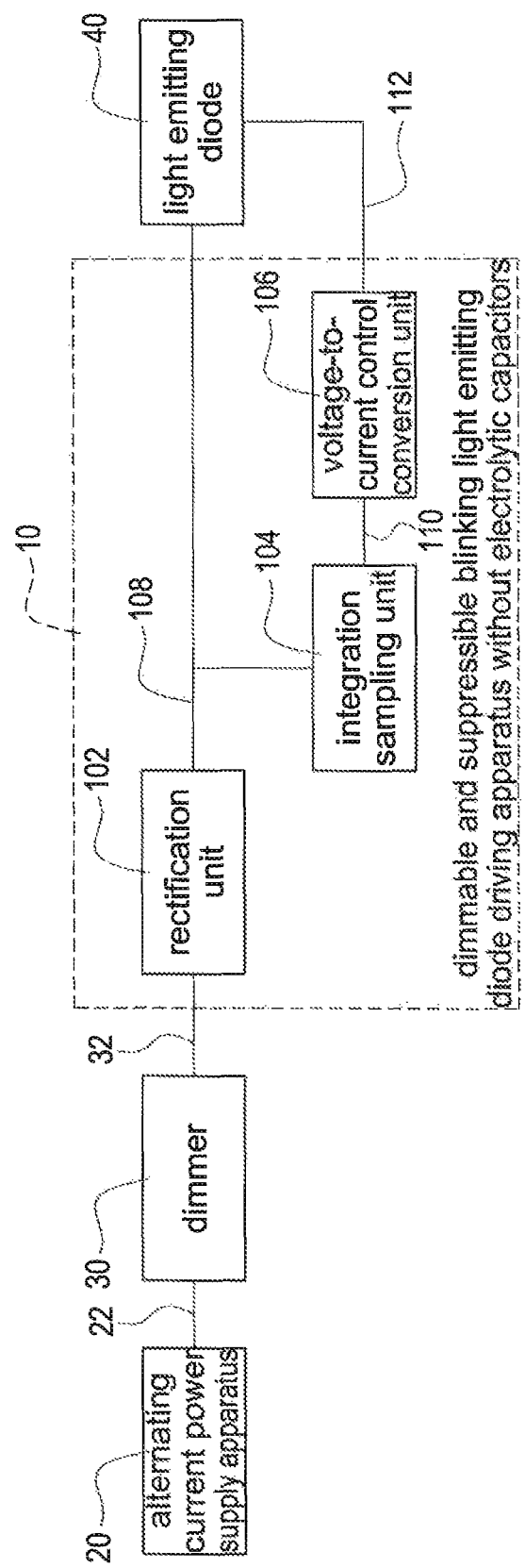
FIG. 1 shows a block diagram of the first embodiment of the dimmable and blink-suppressible light emitting diode driving apparatus without electrolytic capacitors of the present invention.

FIG. 1 shows a block diagram of the first embodiment of the dimmable and blink-suppressible light emitting diode driving apparatus without electrolytic capacitors of the present invention. A light emitting diode driving apparatus 10 is applied to an alternating current power supply apparatus 20, a dimmer 30 and at least a light emitting diode 40. The light emitting diode driving apparatus 10 includes a rectification unit 102, an integration sampling unit 104 and a voltage-to-current control conversion unit 106.

The rectification unit 102 is electrically connected to the dimmer 30 and the light emitting diode 40. The integration sampling unit 104 is electrically connected to the rectification unit 102 and the light emitting diode 40. The voltage-to-current control conversion unit 106 is electrically connected to the integration sampling unit 104 and the light emitting diode 40.

The alternating current power supply apparatus 20 sends an alternating current power 22 to the dimmer 30. The dimmer 30 dims the alternating current power 22 to fetch a dimmed power 32. The dimmer 30 sends the dimmed power 32 to the rectification unit 102. The rectification unit 102 rectifies the dimmed power 32 to fetch a rectified power 108. The rectification unit 102 sends the rectified power 108 to the integration sampling unit 104 and the light emitting diode 40.

The integration sampling unit 104 integrates, samples and converts the rectified power 108 to fetch an integration voltage signal 110. The integration sampling unit 104 sends the integration voltage signal 110 to the voltage-to-current control conversion unit 106. The voltage-to-current control conversion unit 106 converts the integration voltage signal 110 to fetch a driving current signal 112 to drive the light emitting diode 40. The driving current signal 112 is constant, so that the light emitting diode 40 is not blinking.

Figure 2:
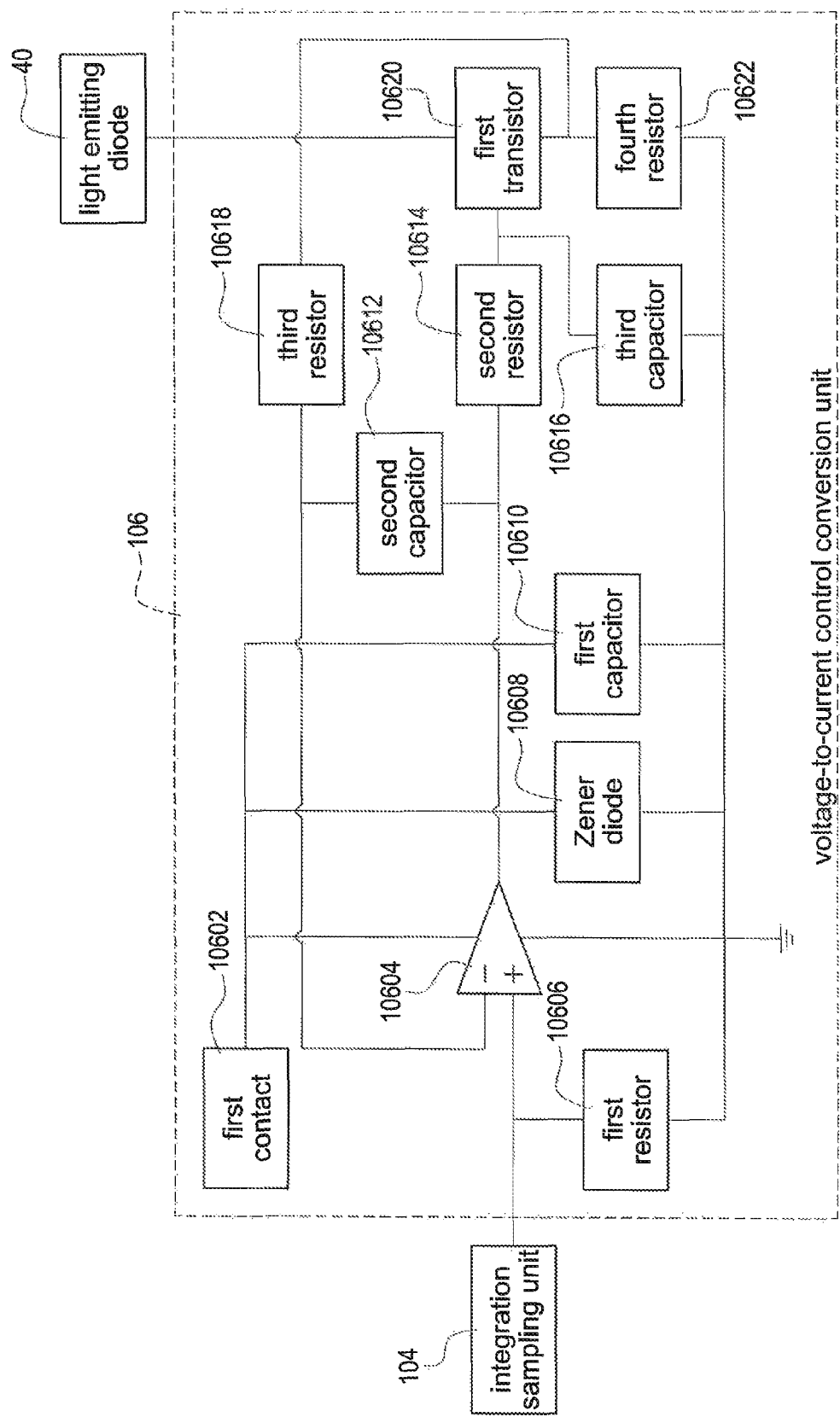
FIG. 2 shows a block diagram of the voltage-to-current control conversion unit of the present invention.

FIG. 2 is a block diagram of the voltage-to-current control conversion unit of the present invention. The voltage-to-current control conversion unit 106 includes a first contact 10602, a first operational amplifier 10604, a first resistor 10606, a Zener diode 10608, a first capacitor 10610, a second capacitor 10612, a second resistor 10614, a third capacitor 10616, a third resistor 10618, a first transistor 10620 and a fourth resistor 10622.

The first operational amplifier 10604 is electrically connected to the first contact 10602 and the integration sampling unit 104. The first resistor 10606 is electrically connected to the first operational amplifier 10604 and the integration sampling unit 104. The Zener diode 10608 is electrically connected to the first contact 10602. The first capacitor 10610 is electrically connected to the first contact 10602. The second capacitor 10612 is electrically connected to the first operational amplifier 10604.

The second resistor 10614 is electrically connected to the first operational amplifier 10604 and the second capacitor 10612. The third capacitor 10616 is electrically connected to the second resistor 10614. The third resistor 10618 is electrically connected to the first operational amplifier 10604 and the second capacitor 10612. The first transistor 10620 is electrically connected to the second resistor 10614, the third capacitor 10616, the third resistor 10618 and the light emitting diode 40. The fourth resistor 10622 is electrically connected to the third resistor 10618 and the first transistor 10620.

Figure 3:
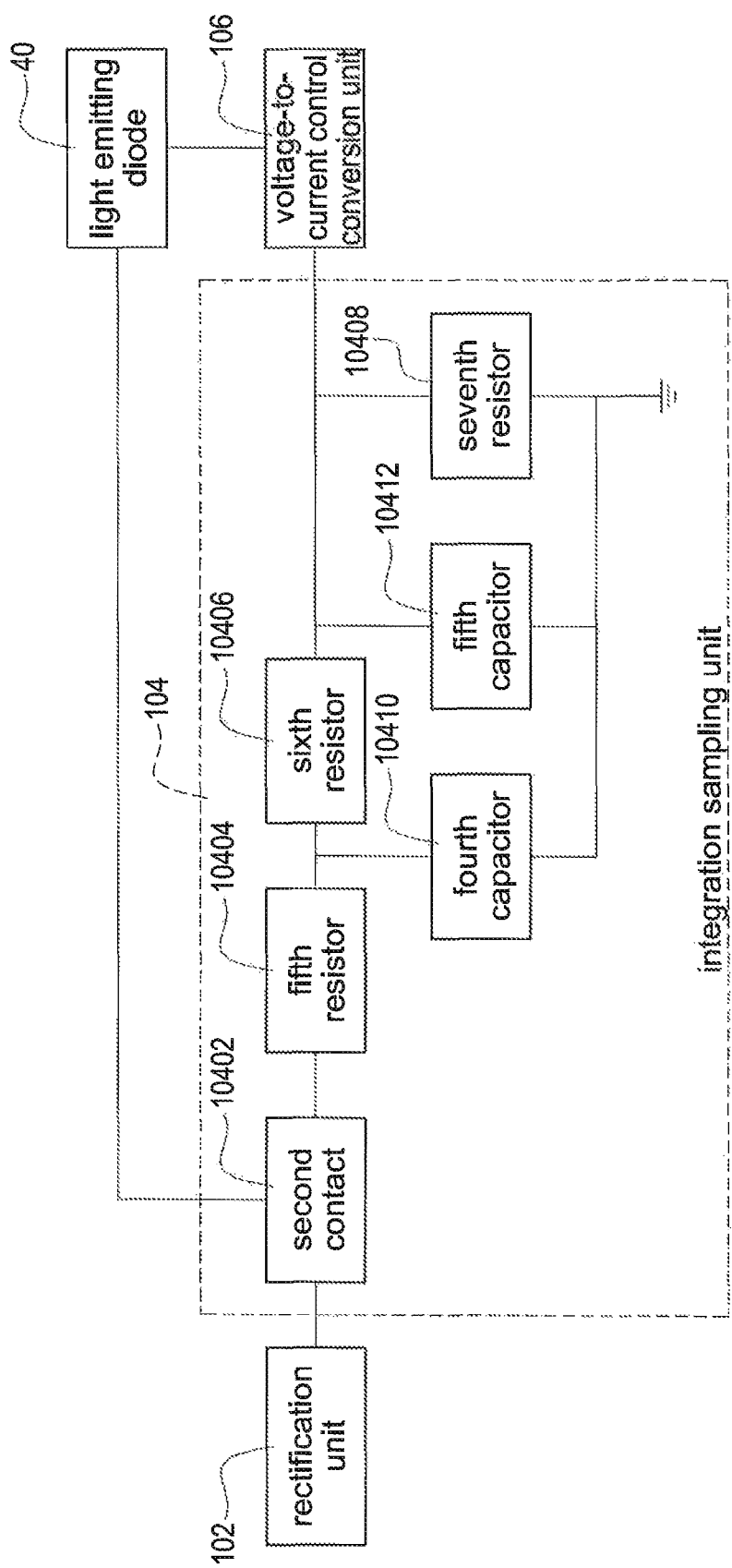
FIG. 3 shows a block diagram of the integration sampling unit of the present invention.

FIG. 3 shows a block diagram of the integration sampling unit of the present invention. The integration sampling unit 104 includes a second contact 10402, a fifth resistor 10404, a sixth resistor 10406, a seventh resistor 10408, a fourth capacitor 10410 and a fifth capacitor 10412.

The second contact 10402 is electrically connected to the rectification unit 102 and the light emitting diode 40. The fifth resistor 10404 is electrically connected to the second contact 10402. The sixth resistor 10406 is electrically connected to the fifth resistor 10404 and the voltage-to-current control conversion unit 106. The seventh resistor 10408 is electrically connected to the sixth resistor 10406 and the voltage-to-current control conversion unit 106. The fourth capacitor 10410 is electrically connected to the fifth resistor 10404 and the sixth resistor 10406. The fifth capacitor 10412 is electrically connected to the sixth resistor 10406, the voltage-to-current control conversion unit 106 and the seventh resistor 10408.

Figure 4:
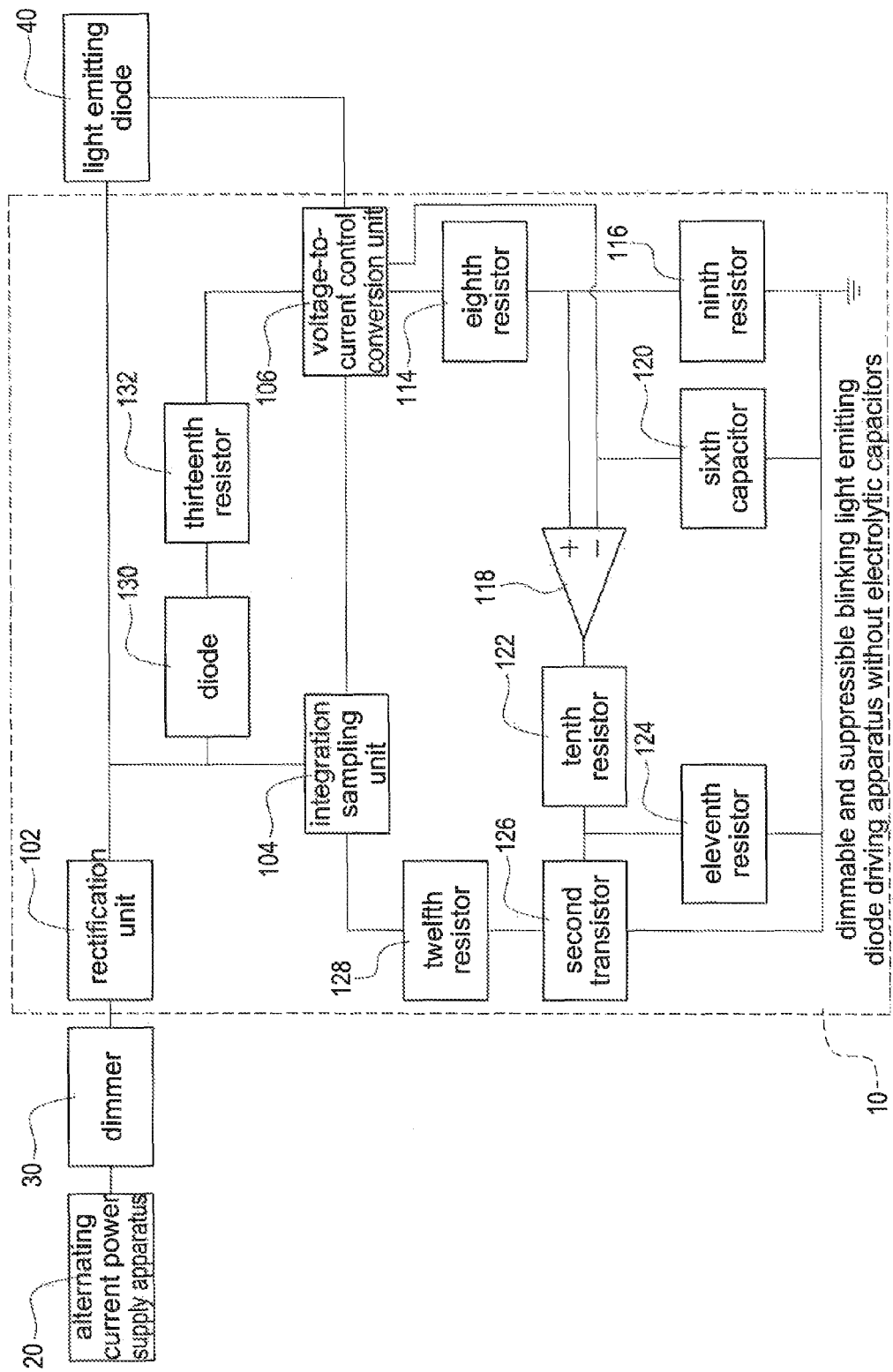
FIG. 4 shows a block diagram of the second embodiment of the dimmable and blink-suppressible light emitting diode driving apparatus without electrolytic capacitors of the present invention.

FIG. 4 shows a block diagram of the second embodiment of the dimmable and blink-suppressible light emitting diode driving apparatus without electrolytic capacitors of the present invention. The description for the elements shown in FIG. 4, which are similar to those shown in FIG. 1-3, is not repeated here for brevity. The light emitting diode driving apparatus 10 further includes an eighth resistor 114, a ninth resistor 116, a second operational amplifier 118, a sixth capacitor 120, a tenth resistor 122, an eleventh resistor 124, a second transistor 126, a twelfth resistor 128, a diode 130 and a thirteenth resistor 132.

The eighth resistor 114 is electrically connected to the first contact 10602. The ninth resistor 116 is electrically connected to the eighth resistor 114. The second operational amplifier 118 is electrically connected to the eighth resistor 114, the ninth resistor 116, the third resistor 10618, the fourth resistor 10622 and the first transistor 10620. The sixth capacitor 120 is electrically connected to the third resistor 10618, the fourth resistor 10622, the first transistor 10620 and the second operational amplifier 118. The tenth resistor 122 is electrically connected to the second operational amplifier 118. The eleventh resistor 124 is electrically connected to the tenth resistor 122. The second transistor 126 is electrically connected to the tenth resistor 122 and the eleventh resistor 124. The twelfth resistor 128 is electrically connected to the second transistor 126 and the second contact 10402. The diode 130 is electrically connected to the second contact 10402. The thirteenth resistor 132 is electrically connected to the diode 130 and the first contact 10602.

The advantage of the present invention is that the light emitting diode is not blinking when the light emitting diode is applied to a conventional dimmer. Moreover, the light emitting diode driver does not need electrolytic capacitors for filtering.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A dimmable and blink-suppressible light emitting diode driving apparatus, the light emitting diode driving apparatus applied to an alternating current power supply apparatus, a dimmer and at least a light emitting diode, the light emitting diode driving apparatus comprising:
   a rectification unit electrically connected to the dimmer and the light emitting diode;
   an integration sampling unit electrically connected to the rectification unit and the light emitting diode; and
   a voltage-to-current control conversion unit electrically connected to the integration sampling unit and the light emitting diode,
   wherein the alternating current power supply apparatus sends an alternating current power to the dimmer; the dimmer dims the alternating current power to fetch a dimmed power; the dimmer sends the dimmed power to the rectification unit; the rectification unit rectifies the dimmed power to fetch a rectified power; the rectification unit sends the rectified power to the integration sampling unit and the light emitting diode; the integration sampling unit integrates, samples and converts the rectified power to fetch an integration voltage signal; the integration sampling unit sends the integration voltage signal to the voltage-to-current control conversion unit; the voltage-to-current control conversion unit converts the integration voltage signal to fetch a driving current signal to drive the light emitting diode,
   wherein the voltage-to-current control conversion unit comprises:
   a first contact;
   a first operational amplifier electrically connected to the first contact and the integration sampling unit;
   a first resistor electrically connected to the first operational amplifier and the integration sampling unit;
   a zener diode electrically connected to the first contact;
   a first capacitor electrically connected to the first contact;
   a second capacitor electrically connected to the first operational amplifier;
   a second resistor electrically connected to the first operational amplifier and the second capacitor;
   a third capacitor electrically connected to the second resistor;
   a third resistor electrically connected to the first operational amplifier and the second capacitor;
   a first transistor electrically connected to the second resistor, the third capacitor, the third resistor and the light emitting diode; and
   a fourth resistor electrically connected to the third resistor and the first transistor, wherein the integration sampling unit comprises:
   a second contact electrically connected to the rectification unit and the light emitting diode;
   a fifth resistor electrically connected to the second contact;
   a sixth resistor electrically connected to the fifth resistor and the voltage-to-current control conversion unit;
   a seventh resistor electrically connected to the sixth resistor and the voltage-to-current control conversion unit;
   a fourth capacitor electrically connected to the fifth resistor and the sixth resistor; and
   a fifth capacitor electrically connected to the sixth resistor, the voltage-to-current control conversion unit and the seventh resistor.

2. The light emitting diode driving apparatus in claim 1, further comprising:
   an eighth resistor electrically connected to the first contact;
   a ninth resistor electrically connected to the eighth resistor; and
   a second operational amplifier electrically connected to the eighth resistor, the ninth resistor, the third resistor, the fourth resistor and the first transistor.

3. The light emitting diode driving apparatus in claim 2, further comprising:
   a sixth capacitor electrically connected to the third resistor, the fourth resistor, the first transistor and the second operational amplifier;
   a tenth resistor electrically connected to the second operational amplifier; and
   an eleventh resistor electrically connected to the tenth resistor.

4. The light emitting diode driving apparatus in claim 3, further comprising:
   a second transistor electrically connected to the tenth resistor and the eleventh resistor; and
   a twelfth resistor electrically connected to the second transistor and the second contact.

* * * * *